(12) United States Patent
Arslan et al.

(10) Patent No.: US 11,405,244 B2
(45) Date of Patent: Aug. 2, 2022

(54) SINGLE CARRIER TRANSMISSION WITH ADAPTIVE ROLL-OFF FACTOR FOR ULTRA RELIABLE AND LOW LATENCY COMMUNICATION SYSTEMS

(71) Applicant: ISTANBUL MEDIPOL UNIVERSITESI, Istanbul (TR)

(72) Inventors: Hüseyin Arslan, Istanbul (TR); Seda Dogan, Istanbul (TR); Armed Tusha, Istanbul (TR)

( * ) Notice: Subject to any disclaimer, the term of this patent is extended or adjusted under 35 U.S.C. 154(b) by 0 days.

(21) Appl. No.: 17/311,845

(22) PCT Filed: Dec. 24, 2019

(86) PCT No.: PCT/TR2019/051198
§ 371 (c)(1),
(2) Date: Jun. 8, 2021

(87) PCT Pub. No.: WO2020/139294
PCT Pub. Date: Jul. 2, 2020

(65) Prior Publication Data
US 2022/0021565 A1  Jan. 20, 2022

(30) Foreign Application Priority Data
Dec. 27, 2018  (TR) ................................. 2018/20700

(51) Int. Cl.
*H03K 5/159* (2006.01)
*H04B 1/10* (2006.01)
*H04L 25/03* (2006.01)

(52) U.S. Cl.
CPC ............................... *H04L 25/0384* (2013.01)

(58) Field of Classification Search
CPC ................................................... H04L 25/0384
USPC .................................................. 375/232–236
See application file for complete search history.

(56) References Cited

U.S. PATENT DOCUMENTS

| | | | |
|---|---|---|---|
| 2008/0007346 A1* | 1/2008 | Jensen | H03L 7/093 331/16 |
| 2017/0111197 A1* | 4/2017 | McFarthing | H04L 27/266 |
| 2018/0027590 A1 | 1/2018 | Yerramalli et al. | |
| 2018/0054269 A1* | 2/2018 | Cui | H04L 25/03821 |
| 2018/0191545 A1* | 7/2018 | Liu | H04L 7/06 |

FOREIGN PATENT DOCUMENTS

WO  2015185726 A2  12/2015

OTHER PUBLICATIONS

International Search Report for corresponding PCT/TR2019/051198, dated Jun. 23, 2020.
Written Opinion of the International Searching Authority for corresponding PCT/TR2019/051198, dated Jun. 23, 2020.
(Continued)

*Primary Examiner* — Don N Vo
(74) *Attorney, Agent, or Firm* — Egbert, McDaniel & Swartz, PLLC

(57) ABSTRACT

A single carrier transmission that minimizes spectral efficiency loss and reduces out of band emission by using adaptive filtering in a block where different filter parameters are used for different symbols within a block.

1 Claim, 4 Drawing Sheets

(56) References Cited

OTHER PUBLICATIONS

Tusha et al., "Single Carrier Transmission for URLLC with Adaptive Radio Resource Utilization", 2019 15th International Wireless Communications & Mobile Computing Conference (IWCMC) Date of Conference: Jun. 24-28, 2019; DOI: 10.1109/IWCMC.2019.8766484 Jun. 28, 2019 (Jun. 28, 2019).
Bennis et al., "Ultrareliable and Low-Latency Wireless Communication: Tail, Risk, and Scale", Proceedings of the IEEE (vol. 106, Issue: 10, Oct. 2018) pp. 1834-1853; Date of Publication: Sep. 26, 2018 DOI: 10.1109/JPROC.2018.2867029 Sep. 28, 2018 (Sep. 28, 2018).
Parvez et al., "A Survey on Low Latency Towards 5G: RAN, Core Network and Caching Solutions", IEEE Communications Surveys & Tutorials (vol. 20, Issue: 4, Fourthquarter 2018) pp. 3098-3130, Date of Publication: May 28, 2018 DOI: 10.1109/COMST.2018.2841349 May 28, 2018 (May 28, 2018).
Sachs et al., "5G Radio Network Design for Ultra-Reliable Low-Latency Communication", IEEE Network (vol. 32, Issue: 2, Mar.-Apr. 2018) pp. 24-31; Date of Publication: Apr. 2, 2018 DOI: 10.1109/MNET.2018.1700232 Apr. 2, 2018 (Apr. 2, 2018).
Ji et al., "Ultra-Reliable and Low-Latency Communications in 5G Downlink: Physical Layer Aspects", IEEE Wireless Communications (vol. 25, Issue: 3, Jun. 2018) pp. 124-130; Date of Publication: Jul. 4, 2018 DOI: 10.1109/MWC.2018.1700294 Jul. 4, 2018 (Jul. 4, 2018).

\* cited by examiner

SINGLE CARRIER TRANSMISSION WITH ADAPTIVE ROLL-OFF FACTOR FOR ULTRA RELIABLE AND LOW LATENCY COMMUNICATION SYSTEMS

TECHNICAL FIELD

The invention is related to a single carrier transmission for ultra-reliable and low latency communication systems in order to provide a reliable communication system having minimum spectral efficiency loss by using an adaptive roll-off factor in a block.

PRIOR ART

The main goal of 4th Generation (4G) communication systems is to improve the throughput of the system. Besides the enhancement of system throughput, different requirements for various applications should be satisfied in 5th generation (5G) and beyond technologies.

One of the new generation wireless communication technologies is Ultra-Reliable Low Latency Communication systems (URLLC). In order to achieve URLLC technology, reliability needs to be increased up to 99.999% and the latency time needs to be reduced to a maximum 1 millisecond.

The low latency is important for mission critical services and applications, such as automated intelligent transport systems, tele-surgery, fault detection and industry automation. As we know, surgical operations can be carried out with robot arms having URLLC technology. However recently, the complex transportation conditions that have been increasing gradually are expected to be alleviated by transferring information between vehicles correctly with the use of URLLC technology.

Due to this reason, in order to meet the reliability and latency demands that are required for URLLC, various technology components of Long Term Evolution (LTE) including frame structure, resource allocation, link adaptation, and transmission schemes need to be redesigned.

In single carrier transmission, a user transmits its data over the entire frequency band. This corresponds to the shorter symbol time in a time domain. As a result of transferring shorter packages in a time domain, less processing time is created at the transmitter and receiver. By means of reducing the processing time as mentioned herein, a single carrier transmission creates the possibility of providing ultra-reliability within low latency times.

In a standard single carrier transmission, the data bits are initially modulated and following this, the modulated symbols are converted to pulses in order to be able to transmit them via air. The shape of the pulse defines the shape of the signal.

The pulse type for a system is decided by taking into consideration the specific characteristics of the existing pulses. For example, if it is desired for the signal to be localized in both a frequency and a time domain, a Gaussian pulse may be preferred. The Gaussian pulse is used in GSM systems. However, the Gaussian pulse causes interference between symbols. Due to this reason raised-cosine pulses are utilized for communication systems as they are Nyquist pulses.

The Nyquist pulse means that there are no contributions from other pulses in the peak point of each pulse. In other words, due to the orthogonality between the pulses, there is no interference between symbols, as experienced with the Gaussian pulse.

The Raised Cosine pulse is localized in the frequency domain, however, it needs infinite time to be created. Therefore the pulse is truncated in the time domain. There are three basic parameters that characterize the raised-cosine filter. These are sampling frequency, span and the roll-off factor. The sampling frequency defines the number of samples per second. The span decides the number of symbols for the truncation. The roll-off factor defines the power of the filter side lobes at the time domain and the bandwidth that is occupied in the frequency domain.

The range of the roll-off factor is between 0 and 1, and the increasing of the roll-off factor results with a better-localized signal in the time domain, corresponding to a wider consumed bandwidth at the frequency domain, and with a lower self-interference caused by truncation. Due to this reason the reliability of the transmission increases. However, on the other hand, the unnecessary increase in roll-off factor leads to losses in spectral efficiency.

Raised CosineIn conventional single carrier transmission, Raised Cosine pulses with the same roll-off factor are used within a block, as shown in FIG. 1. There is an interference between the blocks due to out of band emission. In current single carrier systems, high roll-off factor is used for Raised Cosine pulses within a block to mitigate out of band emission because of low level of side-lobes. However, it results in loss of spectral efficiency. Majority level of the out of band emission is decided by edge pulses within the block. The pulses locates in the center of the block causes less out of band emission since tails of Raised Cosine filter have time to fade. However, the required time for edge pulses to fade is less, and thus the edge pulses causes higher out of band emission. Hence, roll-off factor should be carefully selected to both minimize inter-symbol interference and out-of band emission.

The bandwidth consumed with a Raised Cosine pulse as a function of the data speed (R) and the roll-off factor (a) used, is defined as $BW=R \cdot (1+\alpha)$. The bandwidth that is consumed herein respectively equals to R and 2R for $\alpha=0$ and $\alpha=1$. Therefore when the Raised Cosine pulse which is $\alpha=1$, is compared to the Raised Cosine pulse which is $\alpha=0$, it consumes twice as much bandwidth.

AIM OF THE INVENTION

The aim of the invention is to provide a single carrier transmission system having;
reduced adjacent channel interference,
higher reliability in comparison to conventional systems which occupy the same bandwidth,
reduced latency,
reduced bandwidth, by means of reducing out of band emission and providing minimum loss of spectral efficiency, by using an adaptive roll-off factor in a block.

DESCRIPTION OF THE INVENTION

The single carrier transmission subject to the invention is formed of steps that minimizes spectral efficiency loss and reduces out of band emission by using adaptive filtering in a block. Different filter parameters for different symbols in a specific block are used in single carrier transmission.

Figure 3:
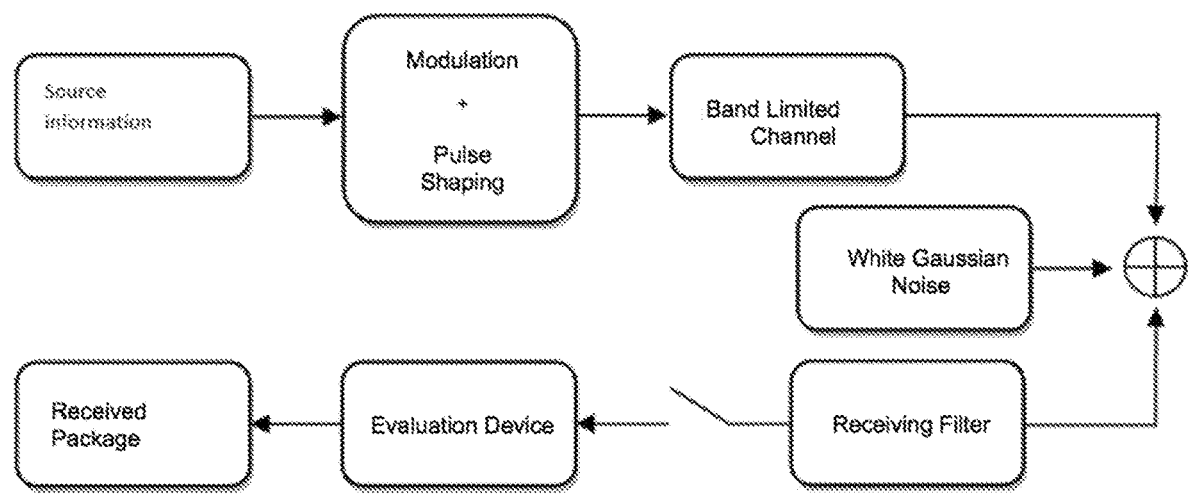

These process steps have been illustrated in FIG. 3. The original information source herein can be digitalized if necessary as some messages need to be digital naturally, due to their structures. Said information source can be any type of data files such as a sound, music, picture or video file. The source-coding is used in order to compress the message that increases spectral efficiency of a communication system.

After the message information is prepared, the message is converted into symbols. Before transmitting the signal, the symbols are filtered by square root Raised Cosine (SRRC) filters in a transmitter.

Figure 1:
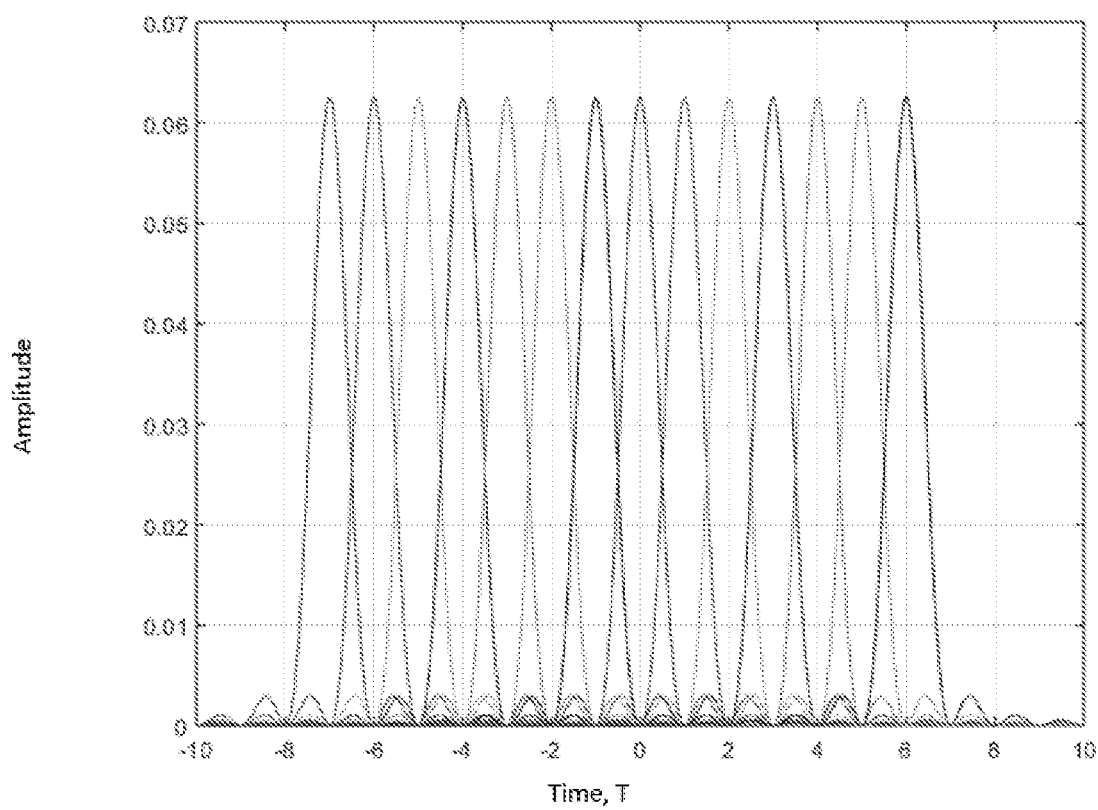
FIG. 1. Shows a classic single carrier transmission graph having a fixed roll-off factor FIG. 2. Shows a single carrier transmission graph having an adaptive roll-off factor FIG. 3. Shows a block diagram of a single carrier transmission FIG. 4. Shows a spectrum graph for single-carrier transmission having a fixed roll-off factor and an adaptive roll-off factor
Figure 2:
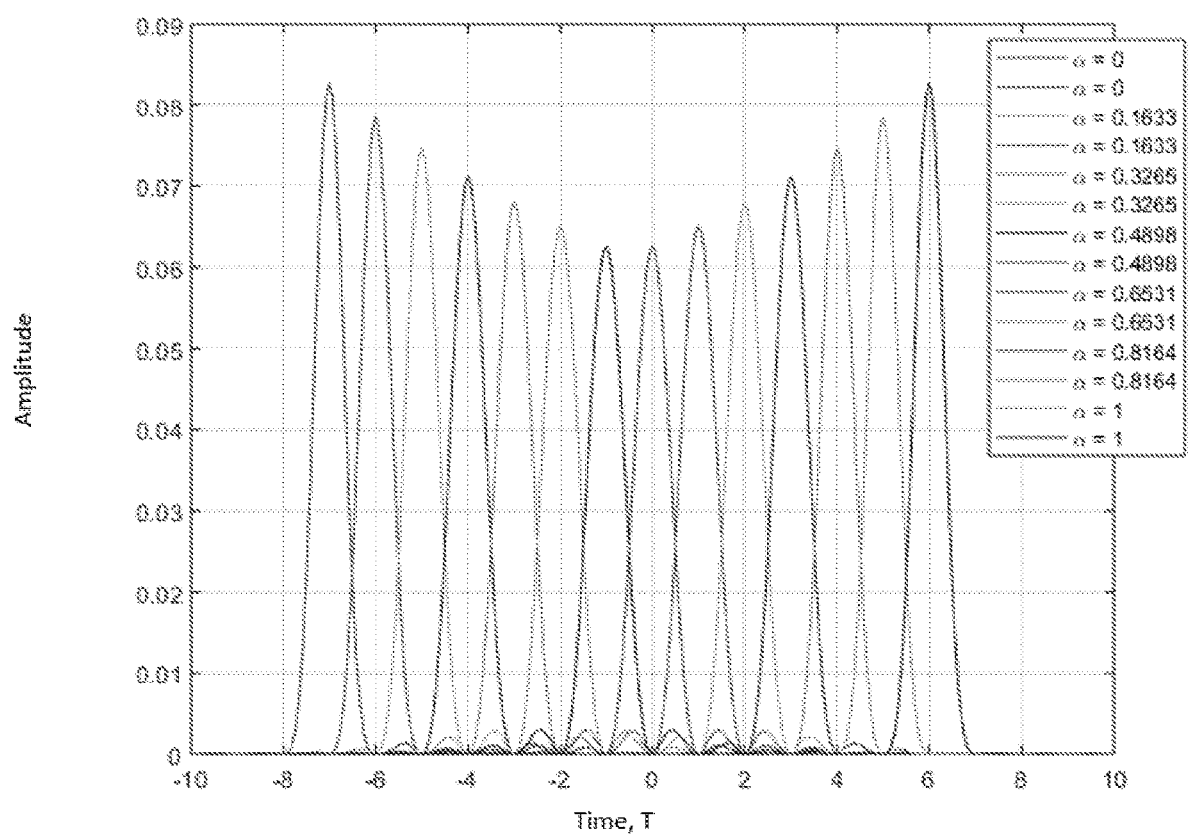

The filtering process of the data information that has been transmitted is necessary in order to control or reduce out of band emission. As illustrated in FIG. 2, square root Raised Cosine (SRRC) pulses having variable roll-off factors are used in order to reduce out of band emission and increasing reliability to have minimum losses in spectral efficiency for URLLC.

The minimum roll-off factor is used for the center symbols for the transmitted data block and the roll-off factor is increased successively from the center pulses towards the edge pulses, cause more out of band emission. Due to this reason, the maximum roll-off factor is used for side pulses.

The signal that is transmitted travels over a wireless channel with a limited band. The additive white Gaussian noise (AWGN) is added before reaching the receiver, to the signal that is transmitted which comprises a channel effect.

The receiver uses the same SRRC filter and roll-off factor that is used in the transmitter. In this way, the overall filter is a Raised-Cosine filter.

The single carrier transmission is formed of the following process steps that minimizes spectral efficiency loss and reduces out of band emission by using adaptive filtering in a block;
- digitalizing the original information source if necessary in order to carry out the encoding,
- coding the information source in order to compress the message that increases spectral efficiency of a communication system,
- filtering the symbols by square root Raised Cosine (SRRC) filter having variable roll-off factors before the transmission of the signal, in order to control and reduce out of band emission,
- using the minimum roll-off factor, for the center symbols of a data block that has been transmitted in order to reduce out of band emission and to increase reliability by enabling minimum loss in spectral efficiency for URLLC.
- successively increasing the roll-off factor from the center pulses towards the edge pulses,
- using the maximum roll-off factor of the SRRC pulses for edge pulses as it affects the out of band emission more,
- passing the transmitted signal over a wireless channel with a limited band,
- adding the additive white Gaussian noise (AWGN), before reaching the receiver, to the signal that is transmitted which comprises a channel effect,
- the same SRRC filter and roll-off factor that is used in the transmitter in order to provide match-filtering is used by the receiver,
- mapping the symbols to data bits.

Figure 4:
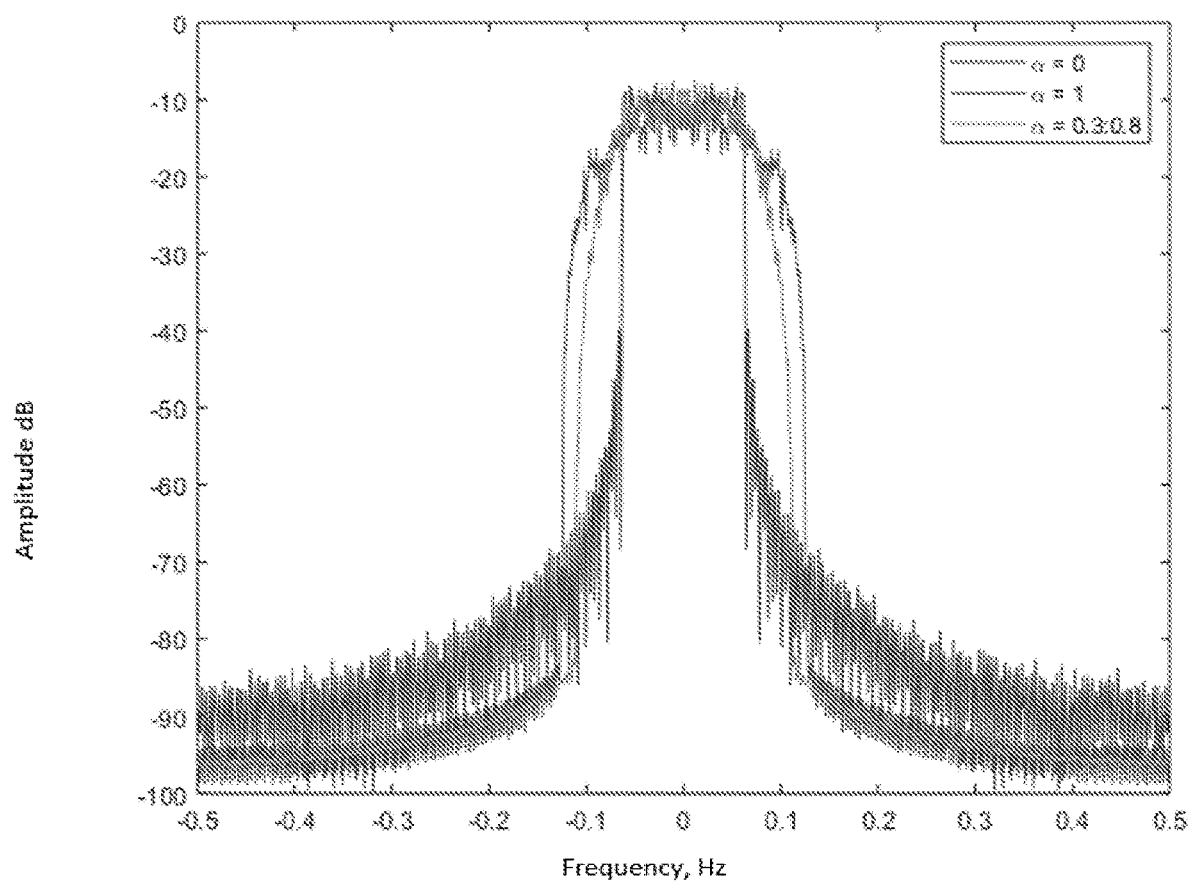

When the proposed single carrier transmission with an adaptive roll-off factor is compared with the classic single carrier transmission with a fixed roll-off factor, it can be seen that it provides reduced adjacent channel interference, lower latency and less occupied bandwidth, as shown in FIG. 4.

Applicability of single carrier with adaptive Raised Cosine filtering does not require any extra step compared with the conventional SC systems. It can easily be applied to industry by using similar methodology with the conventional systems.

The invention claimed is:

1. A single carrier transmission method that minimizes spectral loss and reduces out-of-band emission by using adaptive filtering in a block, the single carrier transmission method comprising:
   digitizing an original information source;
   coding the digitized information source so as to compress a message;
   digitally modulating the coded digitized information to generate information symbols;
   filtering the information symbols by a Raised Cosine filter having variable roll-off factors before a transmission of a signal so as to control and reduce the out-of-band emissions, the step of filtering using a minimum roll-off factor of pulses from the Raised Cosine filter for center symbols of a data block that has been transmitted;
   successively increasing roll-off factors from center pulses toward edge pulses;
   using a maximum roll-off factor of the pulses from the Raised Cosine filter for the edge pulses;
   passing the transmitted signal over a wireless channel with a limited band;
   adding an additive white Gausian noise to the transmitted signal before the transmitted signal reaches a receiver so as to create a channel effect;
   matching-filtering by the receiver with a common Raised Cosine filter and roll-off factor used on the transmitted signal; and
   mapping the filtered symbols to data bits.

* * * * *